United States Patent [19] | [11] 4,008,418
Murphy | [45] Feb. 15, 1977

[54] HIGH VOLTAGE TRANSIENT PROTECTION CIRCUIT FOR VOLTAGE REGULATORS

[75] Inventor: Howard E. Murphy, Redwood City, Calif.

[73] Assignee: Fairchild Camera and Instrument Corporation, Mountain View, Calif.

[22] Filed: Mar. 2, 1976

[21] Appl. No.: 663,017

[52] U.S. Cl. .................................. 361/18; 323/8; 323/22 Z

[51] Int. Cl.$^{2}$ .................................. H02H 3/28

[58] Field of Search .................. 323/8, 22 T, 22 Z; 317/31, 33 R, 33 VR; 307/297

[56] References Cited

UNITED STATES PATENTS

| | | | |
|---|---|---|---|
| 3,371,262 | 2/1968 | Bird et al. | 317/33 VR |
| 3,577,062 | 5/1971 | Hoffman | 323/22 Z |
| 3,579,039 | 5/1971 | Damon | 317/33 VR |
| 3,944,909 | 3/1976 | Reymond | 323/8 X |

*Primary Examiner*—Gerald Goldberg
*Attorney, Agent, or Firm*—Alan H. MacPherson; Henry K. Woodward; Norman E. Reitz

[57] ABSTRACT

A high-voltage transient protection circuit for use in combination with a voltage regulator of the type employing an error amplifier to compare a portion of the controlled output voltage against a reference voltage and adjust the output voltage accordingly. The protection circuit can be used with three terminal positive or negative voltage regulators of either the shunt transistor or series pass transistor types. Oscillation of the protection circuit around a selected transient voltage threshold is avoided by providing a hysteresis characteristic in the response of the circuit to a voltage transient. The circuit is preferably embodied as an integrated circuit in a chip of semiconductor material and is particularly well suited for protecting a voltage regulator and associated electronic systems from the detrimental voltage transients encountered in an automotive environment.

9 Claims, 10 Drawing Figures

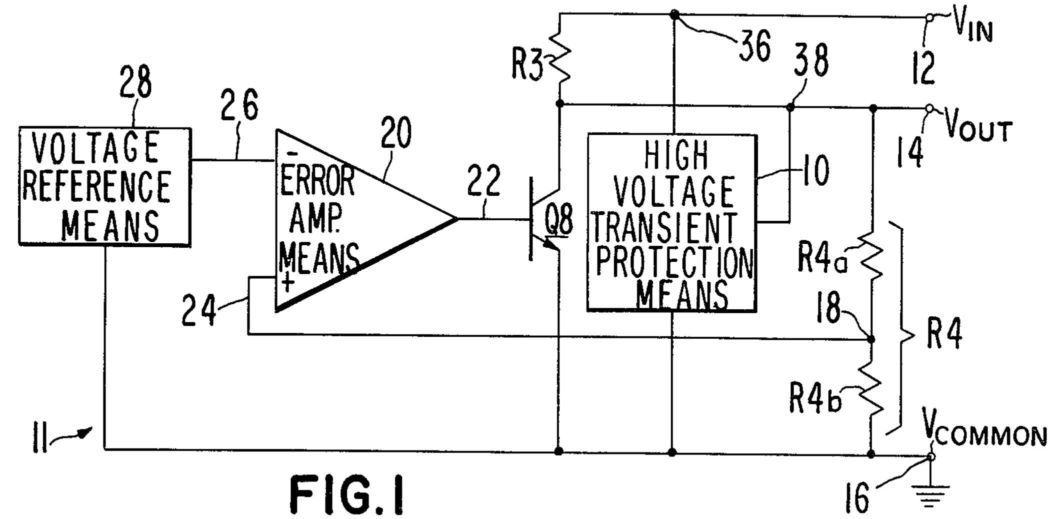
FIG. 1
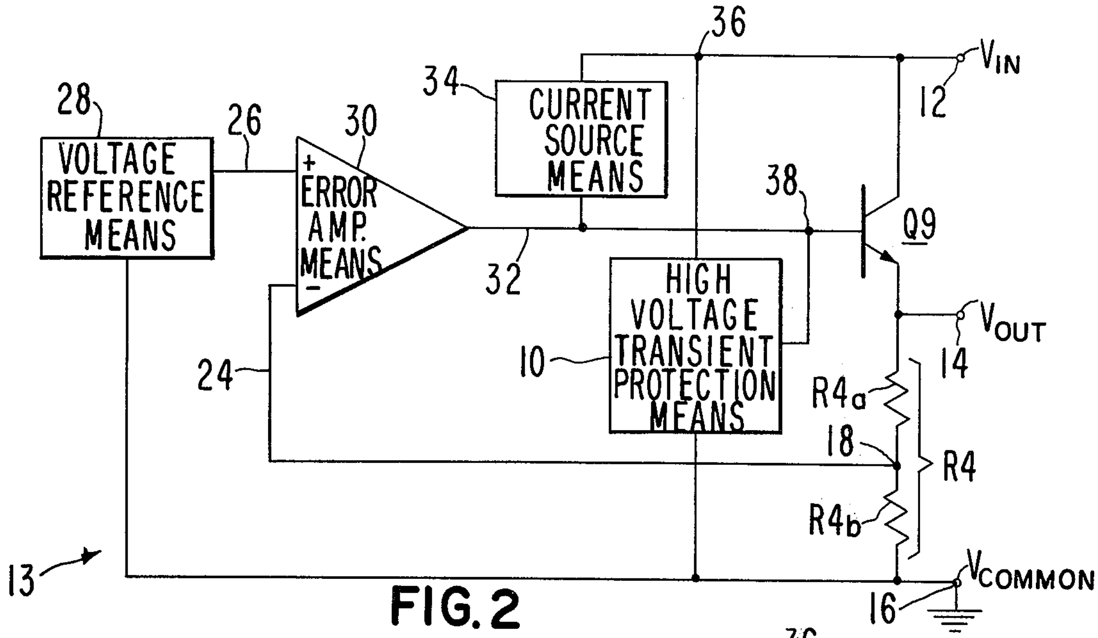
FIG. 2
FIG. 3
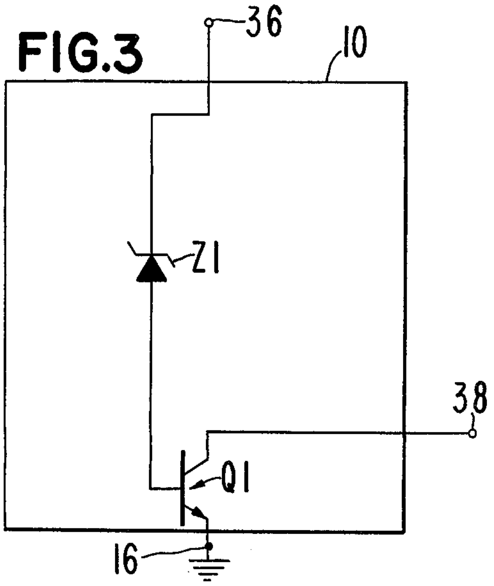
FIG. 4
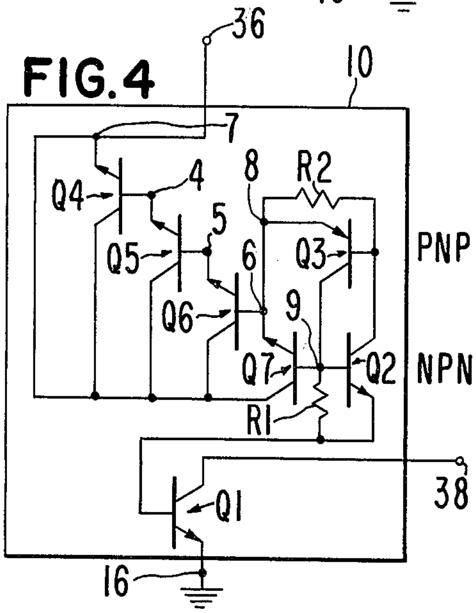

HIGH VOLTAGE TRANSIENT PROTECTION CIRCUIT FOR VOLTAGE REGULATORS

BACKGROUND OF THE INVENTION

I. Field of the Invention

This invention relates generally to voltage regulator circuits capable of providing a relatively constant DC output voltage independent (within limits) of load and supply voltage fluctuations. More specifically, the invention relates to a circuit for protecting such voltage regulators and associated electronic systems from damage by high-voltage transients in the unregulated supply voltage.

II. Description of the Prior Art

Early electronic systems used bulky, high-power regulators made from many discrete components to regulate a line which supplied all areas of an electronic system. Unfortunately, the impedance of this line and associated connectors caused voltage drops which varied throughout the system. Also, any common impedance in this line between critical parts of the system could allow unwanted coupling.

More recently, the trend in systems design has been toward the strategic placement of monolithic three-terminal voltage regulators to achieve accurate local regulation throughout the system. In typical embodiments of these monolithic voltage regulators, a stable reference voltage is developed on chip and compared with the regulator output voltage by an error amplifier. This amplifier requires both high gain and wide band width to ensure good regulation characteristics and fast transient response. It must also have low temperature drift to maintain a high order of output voltage stability under changing temperature conditions. The error amplifier drives an output stage, sometimes including a pair of transistors in Darlington configuration to achieve a higher current capability. Also located on the chip are the necessary bias supplies and a variety of protection circuits. The prior-art protection circuits can provide for thermal shutdown, output current limiting and safe area operation. A wide variety of monolithic voltage regulators are commercially available from many manufacturers. A thorough understanding of the construction and application of these prior-art voltage regulators can be found in numerous texts, articles, U.S. patents and commercial product application literature of which the Fairchild Semiconductor Voltage Regulator Applications Handbook and the National Semiconductor Voltage Regulator Handbook are examples.

The commercially available monolithic voltage regulators are suitable for use over a wide range of applications. However, one potentially large application for voltage regulators remains only partially satisfied. This application is in the growing market for voltage regulation in an automotive environment. In a typical automotive electronic system, high-voltage positive transients frequently occur on the system input power lines. One well-known large positive voltage transient, commonly referred to as the "load dump transient," occurs when the battery terminal is temporarily disconnected while the alternator is supplying battery charging current. Typical automotive system specifications require the ability to survive worst-case load dump transients ranging from 80 volts to 120 volts. These transients can be destructive to integrated circuit electronics in view of their associated energy content. Although other automotive transients reach peak voltages in excess of ±200 volts, their energy content is considerably less than the load dump transient and presents less of a threat to integrated circuit electronics. However, the general characteristics of automotive transients, i.e., large peak voltages, fast rise times and high energy content, are not adequately provided for by protection circuits used in monolithic voltage regulators known in the prior art. A more detailed discussion of automotive transients and their impact on solid-state electronics can be found in an article by William F. Davis on page 419 of the *IEEE Journal of Solid-State Circuits*, Volume SC-8, No. 6, December 1973, entitled "Bipolar Design Considerations for the Automotive Environment."

SUMMARY OF THE INVENTION

The present invention overcomes many of the disadvantages associated with voltage regulators known in the prior art. It does so by providing in combination with a voltage regulator of the type using an error amplifier to provide a constant output voltage and possessing an input terminal and a common terminal, an improved high-voltage transient protection structure including a first transistor having an emitter, a collector and a base, a select one of the first emitter and the first collector operatively connected to the common terminal; and means connected between the input terminal and the first base for biasing the first transistor into conduction in response to a voltage transient applied to the input terminal having a magnitude exceeding a selected value, whereby the magnitude of the constant output voltage from the voltage regulator is not increased during the voltage transient. In a positive voltage regulator, the first transistor can be an NPN-type transistor having the first emitter connected to the common terminal and the means for biasing the first transistor into conduction in response to a voltage transient can possess a hysteresis characteristic in response to the voltage transient by including a second NPN-type transistor having an emitter, a collector and a base, the second emitter connected to the first base; a third PNP-type transistor having an emitter, a collector and a base, the third collector connected to the second base forming a first control node, the third base connected to the second collector; a first resistor connected between the first control node and the second emitter; a second resistor connected between the third emitter forming a second control node thereat and the third base; and a plurality of zener diodes connected in series, anode to cathode, possessing an end anode terminal, an end cathode terminal and at least one intermediate diode connection terminal, the end anode terminal connected to the input terminal of the voltage regulator, the end cathode terminal connected to the first control node and a selected at least one intermediate diode connection terminal connected to the second control node.

BRIEF DESCRIPTION OF THE DRAWINGS

The many objects and advantages of the present invention will become apparent to those skilled in the art when the following description of the best mode contemplated for practicing the invention is read in conjunction with the accompanying drawings, wherein like reference characters refer to the same or similar elements, and in which:

FIG. 1 is a block schematic diagram showing the interrelationship between the high-voltage transient protection circuit of the invention and a generalized three terminal positive shunt voltage regulator;

FIG. 2 is a block schematic diagram showing the interrelationship between the high-voltage transient protection circuit of the invention and a generalized three terminal positive series pass voltage regulator;

FIG. 3 is a schematic diagram of one embodiment of the invention;

FIG. 4 is a schematic diagram of another embodiment of the high-voltage transient protection circuit of the invention;

DETAILED DESCRIPTION OF THE PREFERRED EMBODIMENT

Figure 5:
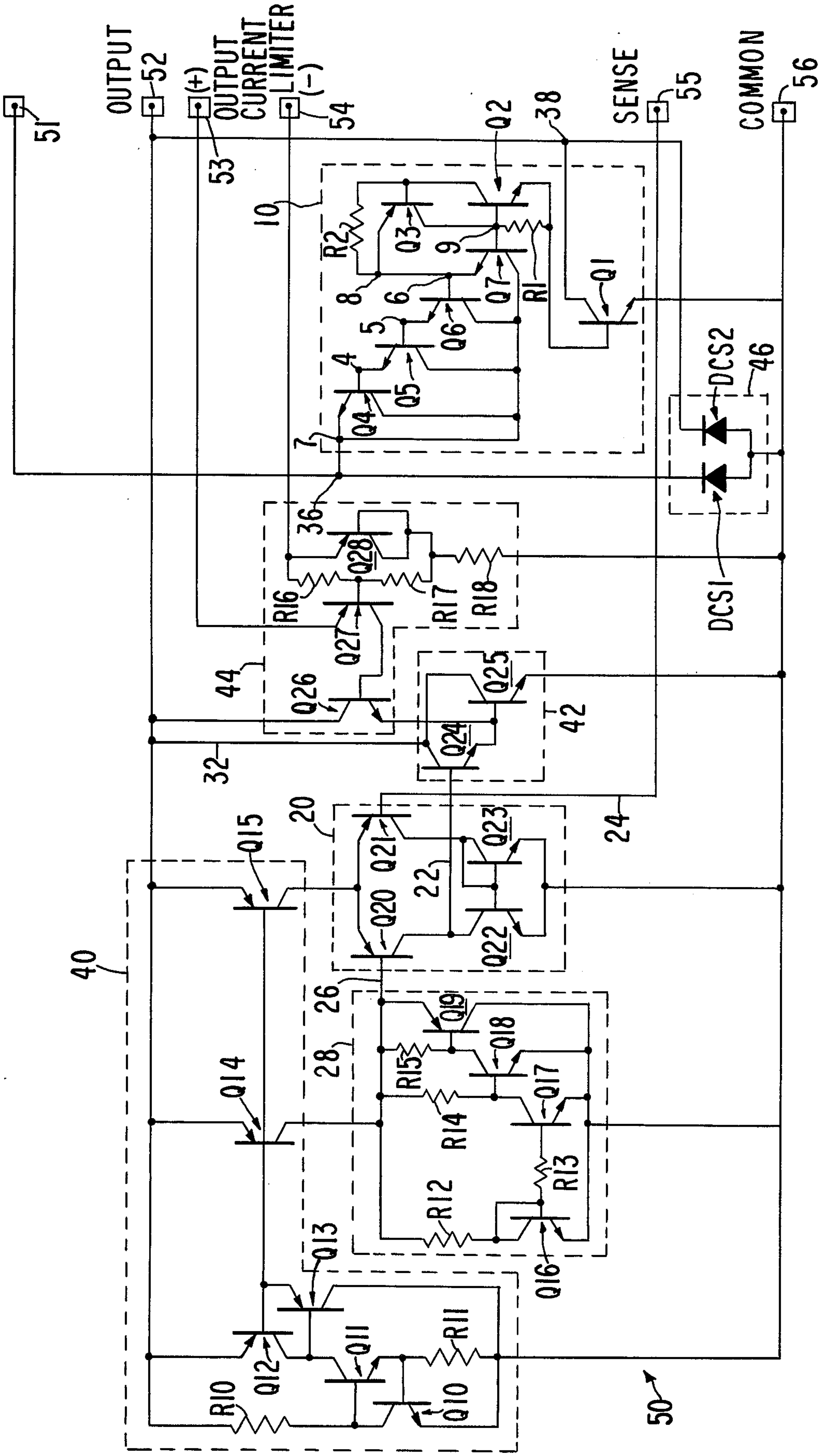
FIG. 5 is a schematic diagram of a monolithic voltage regulator chip including the circuit of FIG. 4.

Referring now generally to the several figures and specifically to FIG. 1, the high-voltage transient protection circuit 10 is shown as part of an improved three terminal positive voltage regulator 11 of the type employing a shunt output transistor Q8. The shunt voltage regulator circuit possesses an input terminal 12, an output terminal 14 and a common terminal 16. An unregulated positive DC supply voltage $V_{IN}$ is applied at the input terminal 12. The regulator circuit 11 functions to provide a constant output voltage $V_{OUT}$ between the output terminal 14 and the common terminal 16 independent (within limits) of load and fluctuations of the supply voltage $V_{IN}$. A voltage-dropping resistor R3 is connected across the input terminal 12 and the output terminal 14. The shunt transistor Q8 possesses an emitter, a collector and a base. In the FIG. 1 embodiment, the shunt transistor Q8 is an NPN transistor having its collector and its emitter connected across the output terminal 14 and the common terminal 16 respectively. The shunt transistor Q8 is so connected because the voltage regulator 11 is designed to regulate a positive voltage. Throughout the several figures only positive voltage regulator circuits are shown. However, it is to be understood that the high-voltage transient protection circuit 10 can also be used with negative voltage regulators. Moreover, those skilled in the art will understand that analagous circuits to those shown in the Figures can be constructed using complementary transistor types and that many other embodiments differing in detail from those described here can be derived. A voltage divider R4 is connected in parallel with the emitter and the collector of the shunt transistor Q8 across the output terminal 14 and the common terminal 16. The voltage divider has an intermediate voltage tap 18 which divides the resistor R4 into a pair of resistors R4*a* and R4*b* as shown. The base of the shunt transistor Q8 is connected with a line 22 to the output of an error amplifier 20. The error amplifier 20 is provided with two inputs, one of which is connected with a line 24 to the intermediate voltage tap 18 on the voltage divider R4. The other input to the error amplifier is connected with a line 26 to the output of a voltage reference 28. In FIG. 1, the high-voltage transient protection structure 10 is shown having three connections, one to the input terminal 12, one to the output terminal 14 and one to the common terminal 16. In operation, the protection circuit 10 prevents damage to either the shunt voltage regulator 11 or to the system to which it is providing voltage by effectively clamping the output voltage $V_{OUT}$ to the common voltage $V_{COMMON}$ during a high-voltage positive input transient.

Another widely used three terminal voltage regulator circuit employs a series pass transistor Q9 and is shown in generalized block schematic diagram form with the high-voltage transient protection circuit 10 in FIG. 2. This improved series pass voltage regulator 13 again possesses an input terminal 12, an output terminal 14 and a common terminal 16. The series pass regulator 13 of FIG. 2 functions much as the shunt regulator 11 of FIG. 1 to provide a constant DC output voltage $V_{OUT}$ independent of load and supply voltage fluctuations. The regulator shown in FIG. 2 is a positive voltage regulator and the series pass transistor Q9 is an NPN-type transistor. Therefore, the collector and emitter of the transistor Q9 are connected across the input terminal 12 and the output terminal 14 respectively. Connected in series with the transistor Q9 across the output terminal 14 and the common terminal 16 is a voltage divider R4 possessing an intermediate voltage tap 18 which divides the resistor R4 into a pair of resistors R4*a* and R4*b* as shown. A current source 34 is connected between the input terminal 12 and the base of the series pass transistor Q9. The output of an error amplifier 30 is also connected via a conductor 32 to the base of the series pass transistor Q9. The error amplifier 30 has a pair of inputs, one of which is connected via a line 24 to the intermediate voltage tap 18 on the voltage divider R4 and the other is connected via a line 26 to the output of a voltage reference 28. In the series pass voltage regulator 13 the high-voltage transient protection circuit 10 again has a pair of leads connected across the input terminal 12 and the common terminal 16. The third lead of the protection circuit 10 is connected to the base of the series pass transistor Q9, thereby protectively turning the transistor Q9 OFF by coupling the base of Q9 to the common terminal 16 whenever the potential on the terminal 12 exceeds a selected value. The voltage supplied to an electronic system by the series pass regulator 13 is thereby reduced to near zero during the transient to insure that no system damage can occur.

FIGS. 3 and 4 show two embodiments of the novel high-voltage transient protection circuit 10. Referring now to FIG. 3, a first transistor Q1 possessing an emitter, a collector and a base is shown having its emitter and collector operatively connected between the common terminal 16 and a node 38. Because in this embodiment Q1 is an NPN-type transistor and the circuit 10 is to be used in combination with a positive voltage regulator, the emitter of the transistor Q1 is connected to the common terminal 16 and the collector is connected to the node 38. A zener diode Z1 is connected between the base of the first transistor Q1 and a node 36 which in both the FIG. 1 and FIG. 2 voltage regulators 11 and 13 is shown connected to the input terminal 12. The first transistor Q1 is driven into saturation when a positive voltage transient applied at the node 36 exceeds the characteristic breakdown voltage $V_{BD}$ of the zener diode Z1, thereby electrically shorting the node 38 to the common terminal 16. A resistor (not shown) can be connected in series with the zener diode Z1 to limit the current flowing through Z1 to a safe value.

A prolonged positive voltage transient in the input voltage $V_{IN}$ having a magnitude approximating the breakdown voltage $V_{BD}$ of the zener diode Z1 can cause the protection circuit of FIG. 3 to oscillate. To reduce noise sensitivity and avoid these possible circuit oscillations, the high-voltage protection circuit 10 can include a hysteresis characteristic in its response to a positive voltage transient. A protection circuit 10 possessing such a hysteresis characteristic in its response is shown in FIG. 4.

In the FIG. 4 embodiment the first transistor Q1 is again an NPN-type transistor having its emitter connected to the common terminal 16 and its collector connected to the node 38. However, the single zener diode Z1 of the FIG. 3 embodiment has been replaced by the structure shown. That structure includes a second transistor Q2 of the NPN type having its base connected to the collector of a third transistor Q3 of the PNP type forming a first control node 9. The base of the third transistor Q3 is connected to the collector of the second transistor Q2. The first resistor R1 is connected between the first control node 9 and the base of the first transistor Q1. One end of a second resistor R2 is connected to the emitter of the third transistor Q3 forming a second control node 8. The other end of the resistor R2 is connected to the base of the transistor Q3. The emitter of the second transistor Q2 is connected to the base of the first transistor Q1. A plurality of zener diodes, shown schematically as base-emitter junctions, are connected in series, anode to cathode, to form a string of diodes possessing an end anode terminal, an end cathode terminal and at least one intermediate diode connection terminal. The end anode terminal is connected to the node 36, the end cathode terminal is connected to the first control node 9 and a selected at least one intermediate diode connection terminal is connected to the second control node 8. The plurality of series-connected zener diodes shown in the FIG. 4 embodiment are formed from a fourth, a fifth, a sixth and a seventh NPN-type transistor Q4, Q5, Q6 and Q7, respectively, each having an emitter, a collector and a base. The emitter of the fourth transistor Q4 is connected to the collectors of the transistors Q4, Q5, Q6 and Q7 to form the end anode terminal 7. The emitter of the transistor Q7 is connected to the base of the transistor Q6 forming an intermediate diode connection terminal 6. In like manner, two other intermediate diode connection terminals, 5 and 4, are formed by connecting the emitter of the transistor Q6 to the base of the transistor Q5 and by connecting the emitter of the transistor Q5 to the base of the transistor Q4. The end cathode terminal of this string of diodes is constituted by the base of the transistor Q7 which is connected to the first control node 9 as shown.

The hysteresis characteristic in the response of the protection circuit 10 shown in FIG. 4 is controlled by the value of the breakdown voltage $V_{BD}$ of each of the series-connected zener diodes, the number of zener diodes connected in series and which intermediate diode connection terminal is selected for connection to the second control node 8. For example, if the breakdown voltage, $V_{BD}$, of each of the four zener diodes formed by the connection of the transistors Q4, Q5, Q6 and Q7 is 7 volts, and if the selected at least one intermediate diode connection terminal is the terminal 6, as shown, then the following remarks apply. When a positive voltage transient is applied at the node 36, no appreciable current will flow through the series-connected reverse-biased base-emitter junctions of diodes Q4, Q5, Q6 and Q7 until the voltage on node 36 is increased beyond approximately 29.4 volts. Negligible base current will be provided to the second transistor Q2 until the voltage on the terminal 36 exceeds $4 \times 7$ or 28 volts, plus the operating base-emitter potentials on the transistors Q1 and Q2 (about 1.4 volts), making the said node 36 voltage of 29.4 volts.

The second transistor Q2 and the third transistor Q3 are configured to form the electrical equivalent of a silicon control rectifier (SCR) which is turned ON when a sufficient base-drive current is applied at the first control node 9 and remains ON as long as sufficient emitter-drive current is applied at the second control node 8. A positive voltage transient applied at the node 36 having a magnitude greater than 29.4 volts turns the SCR formed by the transistors Q2 and Q3 ON, driving the first transistor Q1 into saturation activating the protection circuit 10. The protection circuit remains activated until the transient voltage applied at node 36 falls below 22.4 volts turning the SCR OFF which turns the first transistor Q1 OFF also. This induced hysteresis characteristic in the response of the protection circuit 10 shown in FIG. 4 reduces noise sensitivity and avoids possible circuit oscillations.

A prime virtue of the circuit shown in FIG. 4 is that it is economical to realize as a portion of a monolithic integrated structure by present manufacturing technology. All of the components shown in FIG. 4, with the exception of the first transistor Q1, can be fabricated in the same integrated circuit "pocket." Such common pocket fabrication results in a conservation of circuit die area which improves yield thereby reducing unit cost.

FIG. 5 is a schematic diagram of a voltage regulator chip 50 intended for fabrication as an integrated circuit in a single chip of silicon semiconductor material with conventional processing technology. Although the schematic for the regulator chip 50 includes the novel high-voltage transient protection circuit 10 shown in FIG. 4, it should be understood that the simpler protection circuit shown in FIG. 3 also could be used within block 10 for those systems where noise and/or protective circuit oscillations were not a major concern. The regulator chip 50 has six contact pads 51, 52, 53, 54, 55 and 56 at which external connections can be made and discrete components added to form a variety of voltage regulators. For example, as will be described in greater detail hereinbelow, when the voltage regulator chip 50 is used in combination with the external connections and components shown in FIG. 8, a voltage regulator circuit exhibiting many of the important properties of an adjustable-voltage zener diode is formed. Similarly, the voltage regulator chip 50 can be used in combination with the external connections and components shown in FIG. 9 to form a medium-current adjustable shunt voltage regulator of the same general type as the shunt voltage regulator 11 shown in FIG. 1. In like manner, the voltage regulator chip 50 can be used in combination with the connections and components shown in FIG. 10 to form a high-current adjustable series pass regulator of the same general type as the series pass voltage regulator 13 shown in FIG. 2. Each of the voltage regulators shown in FIGS. 8, 9 and 10 enjoy the benefits of protection from destructive positive high-voltage transients through incorporation of the novel protection circuit 10 as shown in FIG. 4.

Dashed lines are used in FIG. 5 to identify various functional portions of the voltage regulator chip 50. The following table lists typical values for the resistors used in the voltage regulator chip 50 and the voltage regulators shown in FIGS. 8, 9 and 10. All the resistances are given in ohms.

| | | | | | |
|---|---|---|---|---|---|
| R1 | 100K | R7 | 100 | R14 | 10K |
| R2 | 100K | | | R15 | 8K |
| R3 | 100 | R10 | 20K | R16 | 5K |
| R4 | 10K Adj. | R11 | 2K | R17 | 1K |
| R5 | 0.1 | R12 | 1K | R18 | 4K |
| R6 | 1K | R13 | 5K | | |

A biasing circuit 40 including resistors R10, R11 and transistors Q10 through Q15 provides a source of regulated bias current for operation of the voltage reference 28 and the error amplifier 20. The voltage reference 28, including resistors R12 through R15 and transistors Q16 through Q19 connected as shown, is a well-known circuit commonly referred to as a band gap voltage reference. The circuit performs an electrical voltage regulation function which is similar to that of a low-voltage zener diode working in the reverse-biased breakdown mode.

The error amplifier circuit 20 is also of conventional design and includes transistors Q20 through Q23 connected as shown. The output of the voltage reference 28 is connected to one input of the error amplifier 20 by a line 26. The other input of the error amplifier 20 is connected by a line 24 to the contact pad 55. The output of the error amplifier 20 is connected by a line 22 to a Darlington amplifier circuit 42 comprised of a pair of transistors Q24 and Q25 connected as shown. An output current limiter protection circuit 44 is also provided as part of the voltage regulator chip 50. This protection circuit includes resistors R16, R17 and R18 and transistors Q26, Q27 and Q28 which are connected as shown. One external output current-limiting resistor (resistor R5 in the FIG. 9 and FIG. 10 voltage regulators) is connected across the contact pads 53 and 54. The output current from a voltage regulator formed using the voltage regulator chip 50 is allowed to flow through the external current-limiting resistor, thereby generating a voltage differential between the contact pads 53 and 54. In the presently preferred embodiment, the resistors R16 and R17 are 5K and 1K ohms, respectively. Therefore, in this embodiment, the quiescent base-emitter bias on the transistor Q27 is 5/6ths of the base-emitter voltage of transistor Q28. The transistor Q27 thus becomes conductive when the voltage differential between the contact pads 53 and 54 exceeds 1/16th $V_{BE}$, or, in this embodiment, with a silicon transistor junction temperature of 25° C, about 100mV. Thus, a user can program a current limit to suit his system requirements by the selection of an appropriate external output current-limiting resistor. The resistance required is that value which will give, in this embodiment, a voltage drop of 100mV at the desired maximum output current.

As mentioned above, the high voltage transient protection circuit 10 shown in FIG. 4 is included as part of the voltage regulator chip 50. The emitter of the first transistor Q1 is connected to the contact pad 56. The collector of the first transistor Q1 is connected at a node 38 to a line which is in turn connected to the contact pad 52. The end anode terminal 7 is connected at a node 36 to the contact pad 51.

When the voltage regulator chip 50 is fabricated as an integrated circuit in a chip of semiconductor material, collector-substrate (isolation) diodes are formed. The effect of these collector-substrate diodes is as if the pair of diodes $D_{CS1}$ and $D_{CS2}$ were connected as shown. The implicit nature of these diodes is shown by their connection with broken lines. These diodes from a negative voltage protection circuit 46. It is not uncommon for automobile batteries to be installed with inadvertantly reversed polarity, nor for reversed supply line voltage to be temporarily encountered in other electronic systems. The negative voltage protection circuit 46 ensures that neither the voltage regulator chip 50 nor an electronic system which is being provided with a regulated voltage from the chip will be injured by reverse input line voltage because both the contact pads 51 and 56 will be clamped to one diode drop below ground in this condition.

Many obvious variations are possible in the FIG. 5 circuit. For example, because common emitter and common collector terminals are shared by the transistors Q25 and Q1, these transistors can be replaced by a single device both physically and schematically. It is also obvious that alternate circuit designs for the error amplifier 20, reference voltage source 28, biasing source 40, and output current limiter 44 can be realized.

Figure 6:
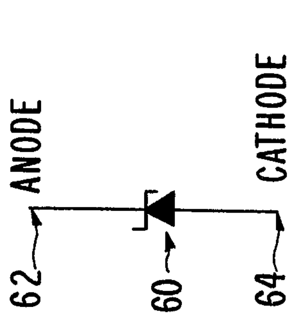
FIG. 6 is a schematic diagram of a zener diode.
Figure 7:
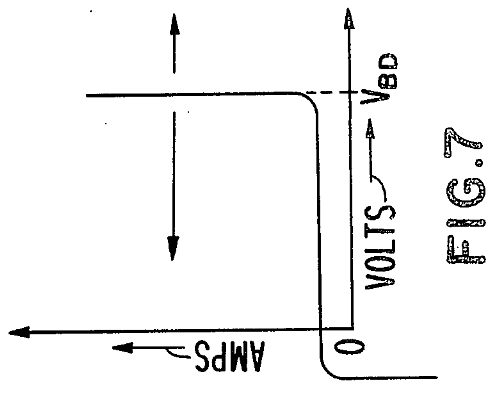
FIG. 7 is a graphical representation of the voltage-current relationship for a zener diode.

FIG. 6 is the schematic symbol for a zener, or avalanche breakdown diode 60 showing the anode end 62 and the cathode end 64. FiG. 7 is a graphical representation of the voltage-current relationship for the zener diode 60. When the zener diode is reverse-biased with a positive voltage differential between cathode and anode, little current flows through the diode until the voltage differential reaches the breakdown voltage $V_{BD}$ as is indicated in FIG. 7. At that voltage the zener diodes are often used as two terminal voltage regulators, voltage clamp or waveform clipping components. Each zener diode has a characteristic breakdown voltage which is permanently established during its manufacture by the processing parameters which are employed.

Figure 8:
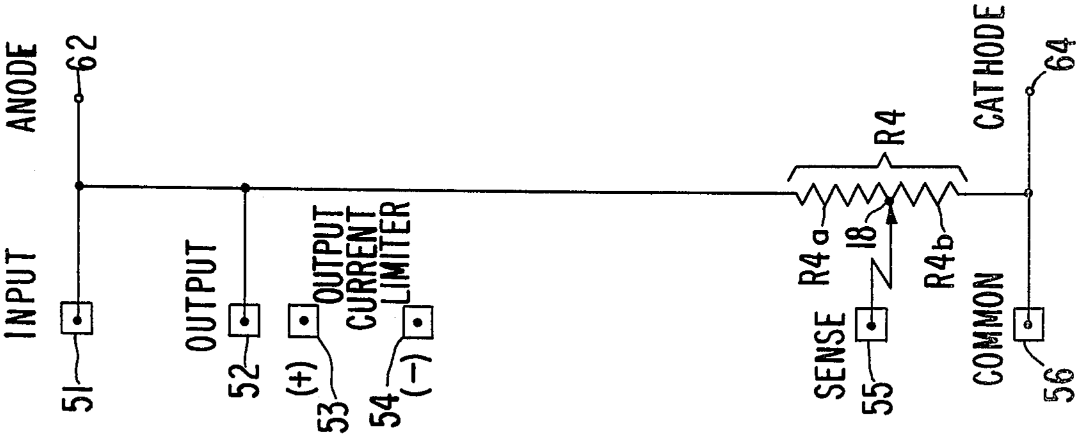
FIG. 8 is a schematic diagram of the external components and connections used with the voltage regulator chip of FIG. 5 to form the electrical equivalent of an adjustage-voltage zener diode.

The voltage regulator chip 50 can be connected as shown in FIG. 8 to form an adjustable clamp diode circuit which is similar in functional characteristics to a conventional zener diode except that the characteristic breakdown voltage $V_{BD}$ can be controlled by adjusting the location of the intermediate voltage tap 18 along the voltage divider resistor R4. The anode terminal 62 and the cathode terminal 64 are connected to the contact pads 51 and 56, respectively. The output current limiter protection circuit 44 is not used in the two-terminal voltage circuit shown in FIG. 8. Therefore, no connections are made to the contact pads 53 and 54.

Figure 9:
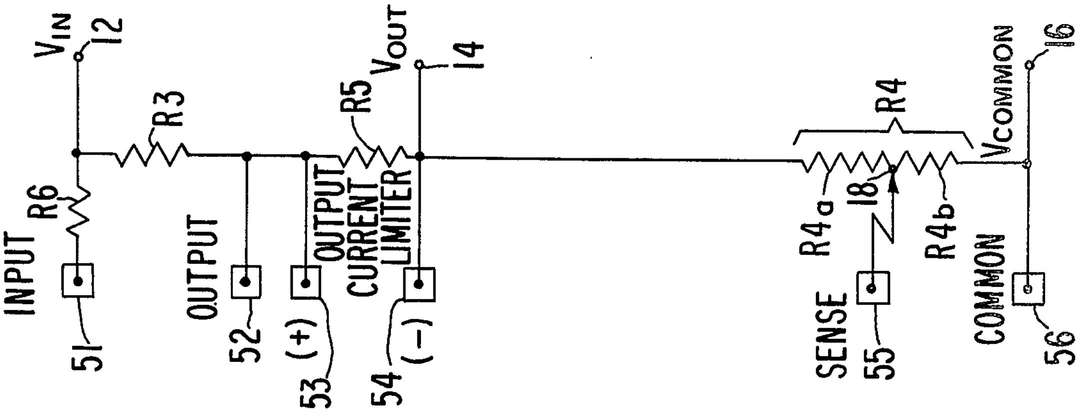
FIG. 9 is a schematic diagram of the external components and connections used with the voltage regulator chip of FIG. 5 to form a three terminal shunt voltage regulator having an adjustable positive DC voltage output.

As mentioned above, the voltage regulator chip 50 can be used with the external connections and components shown in FIG. 9 to form a medium current shunt voltage regulator similar to the shunt voltage regulator 11 shown in FIG. 1. However, an additional 1K ohm high-voltage current-limiting resistor R6 is connected between the input terminal 12 and the contact pad 51 which is in turn connected to the end anode terminal 7 of the high-voltage transient protection circuit 10. Also, the shunt voltage regulator shown in FIG. 9 can utilize the output current limitor protection circuit 44 on the voltage regulator chip 50. In this embodiment, the external output current-limiting resistor R5 is connected across the contact pads 53 and 54 and has a value of 0.1 ohm. In this embodiment, such a value for the resistor R5 provides a maximum output current limit of 1 Amp. The output voltage from the shunt voltage regulator is controlled by adjusting the location of the intermediate voltage tap 18 connected to the contact pad 55. It is to be understood that although the components R6, R3 and R4 are shown connected externally to the voltage regulator chip 50, they can be fabricated in the same chip of semiconductor material as the regulator 50, thereby forming a completely self-contained monolithic three-terminal shunt voltage regulator.

Figure 10:
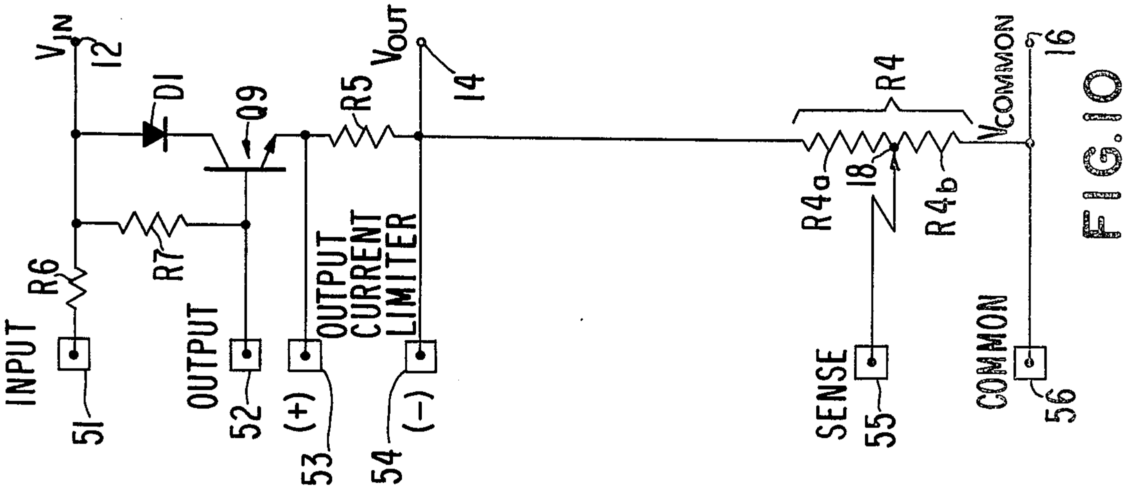
FIG. 10 is a schematic diagram of the external components and connections used with the voltage regulator chip of FIG. 5 to form a three terminal series pass voltage regulator having an adjustable positive DC voltage output.

Again, as mentioned above, the voltage regulator chip 50 can be used in combination with the connections and components shown in FIG. 10 to form a high-current adjustable series pass voltage regulator similar to the series pass regulator 13 shown in FIG. 2. A current-limiting resistor R6 is employed as in the shunt voltage regulator of FIG. 9 to allow the regulator to survive high-voltage transients. The external series pass transistor Q9 is protected against inadvertant reversed supply voltage connections by the series diode D1. In this embodiment, the series pass transistor Q9 can be a type 2N3055 NPN transistor connected as shown. The series diode D1 can be a type 1N2071 diode. In this series pass voltage regulator, the Darlington pair 42 and the error amplifier 20 shown in FIG. 5 together comprise the error amplifier 30 shown in the FIG. 2 circuit. The resistor R7 shown in the FIG. 10 regulator comprises the current source 34 shown in the FIG. 2 regulator.

The voltage regulator chip 50 including the high-voltage transient protection circuit 10 substantially as shown in FIG. 4 is planned for production as an integrated circuit bearing the Fairchild Semiconductor part number LIC389.

From the foregoing detailed description, it will be evident that there are a number of changes, adaptations and modifications of the present invention which come within the province of those skilled in the art; however, it is intended that all such variations not departing from the spirit of the invention be considered as within the scope thereof and limited solely by the appended claims.

What is claimed is:

1. In combination with a voltage regulator of the type using an error amplifier to provide a constant output voltage and possessing an input terminal and a common terminal, and improved high voltage transient protection structure comprising:

a first NPN transistor having an emitter, a collector and a base, a selected one of said first emitter and said first collector operatively connected to said common terminal; and means connected between said input terminal and said first base for biasing said first transistor into conduction in response to a voltage transient applied to said input terminal having a magnitude exceeding a selected value, whereby the magnitude of said constant output voltage from said voltage regulator is not increased during said voltage transient, said means including a second NPN type transistor having an emitter, a collector and a base, said second emitter connected to said first base;

a third PNP type transistor having an emitter, a collector and a base, said third collector connected to said second base forming a first control node, said third base connected to said second collector;

a first resistor connected between said first control node and said second emitter;

a second resistor connected between said third emitter form a second control node thereat and said third base; and a plurality of zener diodes connected in series, anode to cathode, possessing an end anode terminal, an end cathode terminal and at least one intermediate diode connection terminal, said end anode terminal connected to said input terminal of said voltage regulator, said end cathode terminal connected to said first control node and a selected said at least one intermediate diode connection terminal connected to said second control node.

2. The improved high voltage transient protection structure of claim 1 wherein said plurality of zener diodes connected in series comprises:

a fourth, a fifth, a sixth and a seventh NPN type transistor each having an emitter, a collector and a base, said fourth emitter connected to said fourth, fifth, sixth and seventh collectors to form said end anode terminal, said fourth base connected to said fifth emitter, said fifth base connected to said sixth emitter, said sixth base connected to said seventh emitter, forming said at least one intermediate diode connection terminal and said seventh base constituting said end cathode terminal.

3. The improved high voltage transient protection structure of claim 2 embodied as an integrated circuit in a chip of semiconductor material.

4. An improved shunt voltage regulator of the type possessing an input terminal, an output terminal and a common terminal with a shunt resistor connected across said input and said output terminals, a shunt transistor having an emitter, a collector and a base, said emitter and said collector operatively connected across said output and said common terminals in parallel with a voltage divider having an intermediate voltage tap, said base connected to the output of an error amplifier having one input connected to said intermediate voltage tap and another input connected to a voltage reference, wherein the improvement comprises:

a first NPN transistor having an emitter, a collector and a base, said emitter and said collector of said first transistor operatively connected across said output terminal and said common terminal; and means connected between said input terminal and said base of said first transistor for biasing said first transistor into conduction in response to a voltage transient applied at said input terminal whose magnitude exceeds a selected value, whereby said output terminal is protectively coupled to said common terminal during said voltage transient, said means including a second NPN type transistor having an emitter, a collector and a base, said second emitter connected to said first base;

a third PNP type transistor having an emitter, a collector and a base, said third collector connected to said second base forming a first control node, said third base connected to said second collector;

a first resistor connected between said first control node and said second emitter;

a second resistor connected between said third emitter forming a second control node thereat and said third base; and a plurality of zener diodes connected in series, anode to cathode, possessing an end anode terminal, an end cathode terminal and at least one intermediate diode connection terminal, said end anode terminal connected to said input terminal of said shunt voltage regulator, said end cathode terminal connected to said first control node and a selected said at least one intermediate diode connection terminal connected to said second control node.

5. The improved shunt voltage regulator of claim 4 wherein said plurality of zener diodes connected in series comprises:

a fourth, a fifth, a sixth and a seventh NPN type transistor each having an emitter, a collector and a base, said fourth emitter connected to said fourth, fifth, sixth and seventh collectors to form said end anode terminal, said fourth base connected to said fifth emitter, said fifth base connected to said sixth emitter, said sixth base connected to said seventh emitter forming said at least one intermediate diode connection terminal and said seventh base constituting said end cathode terminal.

6. The improved shunt voltage regulator of claim 5 embodied as an integrated circuit in a chip of semiconductor material.

7. An improved series pass voltage regulator of the type possessing an input terminal, an output terminal, a common terminal and a series pass transistor having an emitter, a collector and a base, said emitter and said collector operatively connected across said input and said output terminals, a voltage divider having an intermediate voltage tap connected across said output and said common terminals, a current source connected between said input terminal and said base, an error amplifier having an output connected to said base, one input connected to said intermediate voltage tap and another input connected to a voltage reference, wherein the improvement comprises:

a first NPN transistor having an emitter, a collector and a base, said emitter and said collector of said first transistor operatively connected between said base of said series pass transistor and said common terminal; and means connected between said input terminal and said base of said first transistor for biasing said first transistor into conduction in response to a voltage transient applied at said input terminal whose magnitude exceeds a selected value, whereby said base of said series pass transistor is protectively coupled to said common terminal during said voltage transient, said means including a second NPN type transistor having an emitter, a collector and a base, said second emitter connected to said first base;

a third PNP type transistor having an emitter, a collector and a base, said third collector connected to said second base forming a first control node, said third base connected to said second collector;

a first resistor connected between said first control node and said second emitter;

a second resistor connected between said third emitter forming a second control node thereat and said third base; and a plurality of zener diodes connected in series, anode to cathode, possessing an end anode terminal, an end cathode terminal and at least one intermediate diode connection terminal, said end anode terminal connected to said input terminal of said series pass voltage regulator, said end cathode connected to said first control node and a selected said at least one intermediate diode connection terminal connected to said second control node.

8. The improved series pass voltage regulator of claim 7 wherein said plurality of zener diodes connected in series comprises:

a fourth, a fifth, a sixth and a seventh NPN type transistor each having an emitter, a collector and a base, said fourth emitter connected to said fourth, fifth, sixth and seventh collectors to form said end anode terminal, said fourth base connected to said fifth emitter, said fifth base connected to said sixth emitter, said sixth base connected to said seventh emitter forming said at least one intermediate diode connection terminal and said seventh base constituting said end cathode terminal.

9. The improved series pass voltage regulator of claim 8 embodied as an integrated circuit in a chip of semiconductor material.

* * * * *